(12) United States Patent
Xu

(10) Patent No.: US 11,163,390 B2
(45) Date of Patent: Nov. 2, 2021

(54) FLEXIBLE DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Feng Xu, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 16/758,760

(22) PCT Filed: Apr. 15, 2020

(86) PCT No.: PCT/CN2020/084883
§ 371 (c)(1),
(2) Date: Apr. 23, 2020

(87) PCT Pub. No.: WO2021/042731
PCT Pub. Date: Mar. 11, 2021

(65) Prior Publication Data
US 2021/0232246 A1  Jul. 29, 2021

(30) Foreign Application Priority Data
Sep. 3, 2019 (CN) .......................... 201910828909.9

(51) Int. Cl.
*G06F 3/041* (2006.01)
*G09F 9/30* (2006.01)

(52) U.S. Cl.
CPC ............ *G06F 3/0412* (2013.01); *G09F 9/301* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 6,555,235 B1 * | 4/2003 | Aufderheide | C09J 183/04 156/329 |
| 2002/0050958 A1 * | 5/2002 | Matthies | H01L 25/167 345/55 |
| 2005/0104079 A1 | 5/2005 | Kim | |
| 2007/0176550 A1 | 8/2007 | Kwan | |
| 2014/0015772 A1 * | 1/2014 | Tung | G06F 3/041 345/173 |

(Continued)

FOREIGN PATENT DOCUMENTS

| | | |
|---|---|---|
| CN | 107633775 A | 1/2018 |
| KR | 100645706 B1 | 11/2006 |

*Primary Examiner* — Matthew Yeung
(74) *Attorney, Agent, or Firm* — Dickinson Wright PLLC

(57) ABSTRACT

A flexible display device is provided. The flexible display device includes a display panel, a glass layer, and an adhesive layer. The glass layer is adhered onto a surface of the display panel by the adhesive layer, and an air spacer layer is provided between the display panel and the glass layer. The flexible display device has both enhanced bending performance and strength, and can prevent edges of the display panel from light leakage, thereby improving the display effect.

14 Claims, 3 Drawing Sheets

(56) References Cited

U.S. PATENT DOCUMENTS

| | | | |
|---|---|---|---|
| 2015/0124182 A1* | 5/2015 | Chen | G06F 3/0446 349/12 |
| 2015/0261024 A1* | 9/2015 | Chung | G02F 1/133553 324/762.09 |
| 2019/0355925 A1* | 11/2019 | Hu | B32B 27/00 |

* cited by examiner

30

FLEXIBLE DISPLAY DEVICE

CROSS-REFERENCES TO RELATED APPLICATIONS

The present application claims priority from a Chinese Patent Application filed with the Chinese Patent Office on Sep. 3, 2019, with Application No. 201910828909.9, entitled "FLEXIBLE DISPLAY PANEL", the contents of which are incorporated herein by reference in their entirety.

FIELD OF DISCLOSURE

The present application relates to the field of display technology, and particularly relates to a flexible display device having both enhanced bending performance and strength.

BACKGROUND OF DISCLOSURE

Traditional displays generally use glass as an outermost layer of an entire display device to protect the entire display device. However, it is difficult to use the general glass as the outermost layer in a flexible display device, because the bending performance of the general glass is poor.

At present, in the industry of the flexible display device, it is considered to replace the general glass with hard organics to be the outermost layer, but there are two technical difficulties that need to be solved. First, the respective developments of internal bending and external bending are needed. Second, the property balance is difficult to be determined, and materials with the desired bending performance often do not have desired strength to protect the entire device.

SUMMARY OF DISCLOSURE

Technical Problems

Thus, the problem of the outermost protective layer of the flexible display device has not been well solved. In general, the protective effect of a hardened organic layer employed as the protective layer is far less than that of the glass protective layer. However, the bending performance of the general glass is poor, and it is difficult to be directly used in the flexible display device. The key point to obtain desired bending performance of the glass is to reduce a thickness of the glass. For example, some glass layers have bendability. However, when the thickness of the glass is reduced to a certain level, the protective effect may be greatly reduced.

Therefore, it is urgent to provide a flexible display device having both enhanced bending performance and strength to solve the above problem.

Technical Solutions

The purpose of the present application is to solve the above problems and provide a flexible display device having both enhanced bending performance and strength.

To achieve the above purpose, the flexible display device of the present application adopts the following technical solutions.

A flexible display device comprises a display panel, a glass layer, and an air spacer layer. The glass layer is adhered onto a surface of the display panel by an adhesive layer. The air spacer layer is located between the display panel and the glass layer. The adhesive layer is disposed along an edge of the display panel to define the air spacer layer. A material of the adhesive layer is a black adhesive material or a light-absorbing adhesive.

Further, a thickness of the air spacer layer ranges from 5 to 20 µm.

Further, a thickness of the glass layer is less than 100 µm.

Further, the flexible display device further comprises a back plate. The back plate is disposed on a side of the display panel away from the glass layer.

Further, the flexible display device further comprises a protective cover plate. The protective cover plate is disposed on a side of the glass layer away from the display panel.

Further, the flexible display device further comprises a touch layer. The touch layer is disposed between the glass layer and the protective cover plate.

Further, the flexible display device further comprises a polarizing layer. The polarizing layer is disposed between the touch layer and the protective cover plate.

A flexible display device comprises a display panel, a glass layer, and an air spacer layer. The glass layer is adhered onto a surface of the display panel by an adhesive layer. The air spacer layer is located between the display panel and the glass layer.

Further, the adhesive layer is disposed along an edge of the display panel to define the air spacer layer.

Further, A material of the adhesive layer is a black adhesive material or a light-absorbing adhesive.

Further, a thickness of the air spacer layer ranges from 5 to 20 µm.

Further, a thickness of the glass layer is less than 100 µm.

Further, the flexible display device further comprises a back plate. The back plate is disposed on a side of the display panel away from the glass layer.

Further, the flexible display device further comprises a protective cover plate. The protective cover plate is disposed on a side of the glass layer away from the display panel.

Further, the flexible display device further comprises a touch layer. The touch layer is disposed between the glass layer and the protective cover plate.

Further, the flexible display device further comprises a polarizing layer. The polarizing layer is disposed between the touch layer and the protective cover plate.

Beneficial Effects

The beneficial effects of the flexible display device of the present application are as follows.

(1) By adhering a glass layer onto a display panel, the flexible display device of the present application can have functions of blocking water vapor and outer protection, and overcomes the problem of poor bendability of the general glass employed as the protective layer.

(2) By setting an air spacer layer between the display panel and the glass layer, the flexible display device of the present application can prevent the display panel from being affected by the peeling force in use, and improve the bending resistance performance of the display device.

(3) By using a black adhesive material or a light-absorbing adhesive as an adhesive layer, the flexible display device of the present application can prevent edges of the display panel from light leakage, thereby affecting the display effect.

DETAILED DESCRIPTION OF PREFERRED EMBODIMENTS

Figure 1:
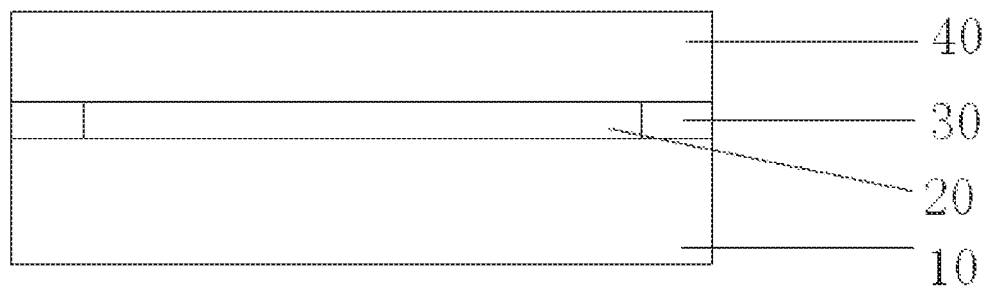
FIG. 1 is a schematic diagram of a flexible display device according to an embodiment of the present application.

The technical solutions of the present application are hereinafter described in detail with reference to the accompanying drawings. Apparently, the embodiments described below are for the exemplary purpose, without covering all embodiments of the present application. Persons of ordinary skill in the art can derive other embodiments from the embodiments given herein without making any creative effort, and all such embodiments are covered in the protection scope of the present application.

The terms "first", "second", "third", and the like (if present) in the description and claims of the present application and the drawings are used to distinguish similar objects, and are not necessarily used to describe a specific order or sequence. It should be understood that the objects described in this way are interchangeable under appropriate circumstances. In addition, the terms "including" and "having" and any variations thereof are intended to cover the inclusion without exclusion.

In the present patent document, the drawings discussed below and the embodiments used to describe the principles disclosed in the present application are for illustration only, and should not be construed as limiting the scope of the disclosure of the present application. Those skilled in the art will understand that, the principles of the present application may be implemented in any suitably arranged system. Exemplary embodiments will be explained in detail, and examples of the embodiments are shown in the drawings. In addition, a terminal according to an exemplary embodiment will be described in detail with reference to the accompanying drawings. The same reference numbers in the drawings refer to the same elements.

The terms used in the specification of the present application are only used to describe specific embodiments, and are not intended to express the concepts of the present application. Unless the context clearly indicates a different meaning, expressions used in the singular encompass the expression used in the plural. In the specification of the present application, it should be understood that, the terms, such as "including", "having", and "containing" are intended to indicate the possibility of the existence of features, numbers, steps, actions, or combinations thereof disclosed in the specification of the present application, and are not intended to exclude the possibility of the existence or addition of one or more other features, numbers, steps, actions, or combinations thereof. The same reference numerals in the drawings refer to the same parts.

FIG. 1 is a schematic diagram of a flexible display device according to an embodiment of the present application. As shown in FIG. 1, the flexible display device comprises a display panel 10, an air spacer layer 20, an adhesive layer 30, and a glass layer 40. The glass layer 40 is adhered onto a surface of the display panel 10 by the adhesive layer 30. The air spacer layer 20 is located between the glass layer 40 and the display panel 10.

Particularly, a thickness of the glass layer 40 is less than 100 μm. In the present embodiment, the thickness of the glass layer 40 is 50 μm, which is arranged in parallel on a front of the display panel 10, and a center of the glass layer 40 corresponds to a center of the display panel 10, thereby ensuring that a film layer in a center region of the display panel 10 receives relatively small tensile stress or compressive stress during the bending process, which is conducive to enhancing the bending performance of the display panel 10.

Particularly, a thickness of the air spacer layer ranges from 5 to 20 μm. By setting the air spacer layer 20, a TFE encapsulation structure of a surface of the display panel 10 can be prevented from being damaged by the peeling force.

Figure 2:
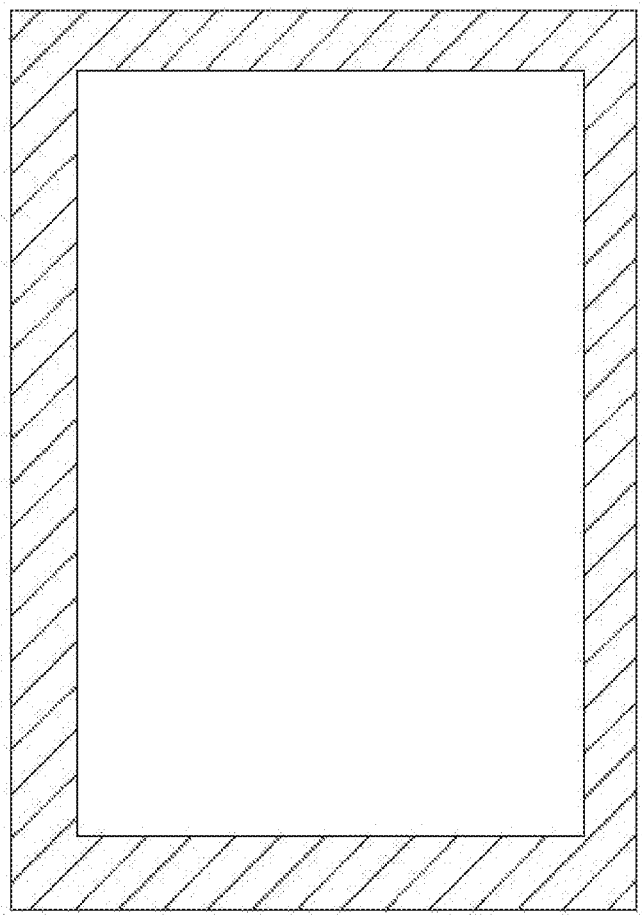
FIG. 2 is a schematic diagram of an adhesive layer according to an embodiment of the present application.

As shown in FIG. 1, the adhesive layer 30 is disposed along an edge of the display panel 10 to define the air spacer layer 20. FIG. 2 is a schematic diagram of an adhesive layer according to an embodiment of the present application. As shown in FIG. 2, in the present embodiment, the adhesive layer 30 has a frame shape.

It should be noted that, the frame shape of the present application does not limit the adhesive layer 30 as a rectangular frame shape as shown in FIG. 2. That is to say, the frame-shaped adhesive layer 30 can be changed according to the shape of the display panel 10.

In particular, a material of the adhesive layer 30 is a black adhesive material or a light-absorbing adhesive. By using the black adhesive material or the light-absorbing adhesive to prepare the adhesive layer 30, the flexible display device of the present application can achieve the adhesion of the display panel 10 and the glass layer 40, and can achieve the function of forming the air spacer layer 20. At the same time, the adhesive layer 30 can absorb the light leaked from the edge of the display panel 10. Finally, by adjusting the thickness of the adhesive layer 30, the space between the display panel 10 and the glass layer 40 can be adjusted. That is, the thickness of the air spacer layer 20 can be adjusted.

In particular, the materials, such as acrylic, silica gel, or PET can be used as the black adhesive material, and pigments, metals, and the like can be added into the adhesive material to adjust the light adsorption of the black adhesive material.

Figure 3:
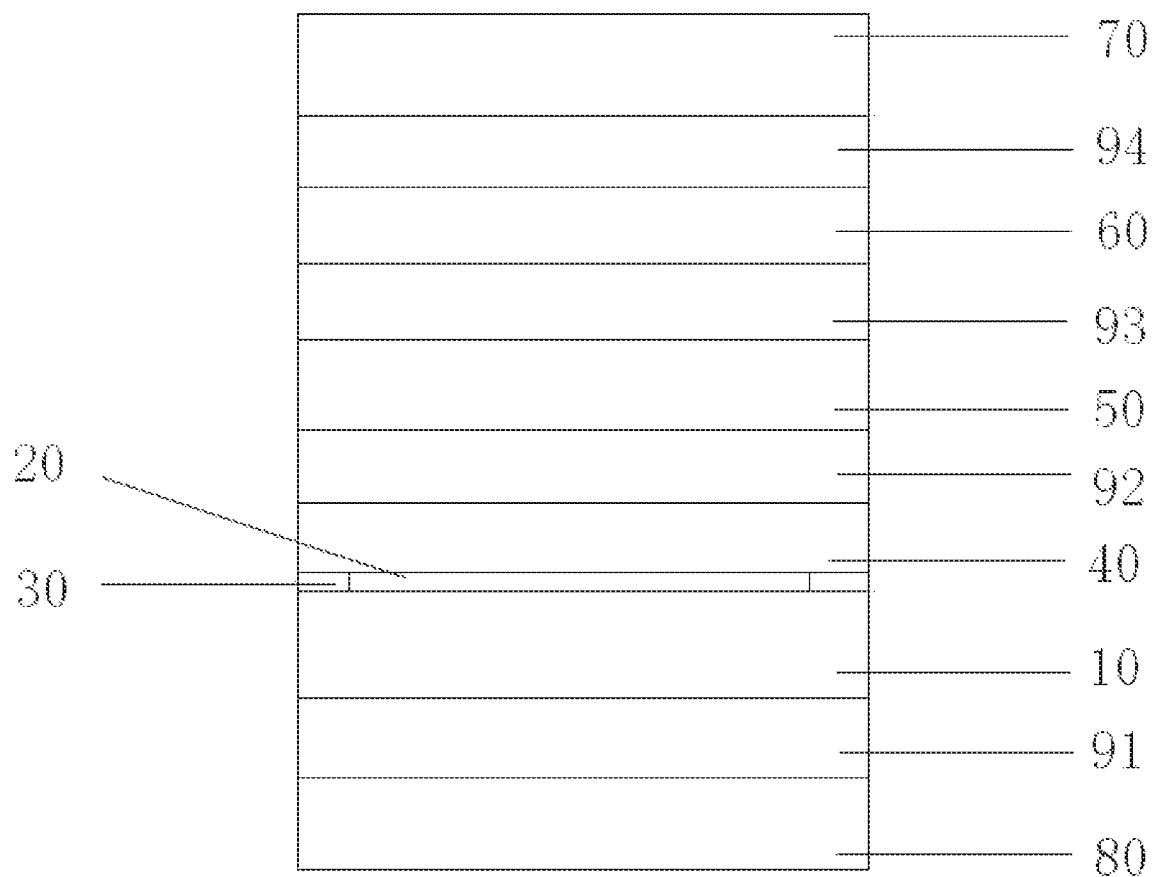
FIG. 3 is a schematic diagram of the flexible display device according to another embodiment of the present application.

FIG. 3 is a schematic diagram of the flexible display device according to another embodiment of the present application. As shown in FIG. 3, in another embodiment, the difference between the flexible display devices in FIG. 3 and FIG. 1 is that, the flexible display device in FIG. 3 not only comprises the display panel 10, the air spacer layer 20, the adhesive layer 30, and the glass layer 40, but also comprises a touch layer 50, a polarizing layer 60, a protective cover plate 70, a back plate 80, and a plurality of adhesive layers.

As shown in FIG. 3, the touch layer 50 is disposed on a side of the glass layer 40 away from the display panel 10. By setting the touch layer 50 on a light emitting side of the display panel 10, the flexible display device 100 of the present application can achieve the touch function.

In the present embodiment, the touch layer 50 is adhered onto the glass layer 40 by an adhesive layer 92. In particular, the touch layer 50 may be a transparent conductive material. The transparent conductive material may be any one or a combination of indium tin oxide (ITO), indium zinc oxide (IZO), and indium gallium zinc oxide (IGZO). By the selecting of the touch layer 50 as the transparent conductive material, the light transmittance of the flexible display device 100 is improved.

As shown in FIG. 3, the polarizing layer 60 is disposed on a side of the touch layer 50 away from the display panel 10. In the present embodiment, the polarizing layer 60 is adhered onto the touch layer 50 by another adhesive layer 93. By setting the another adhesive layer 93 between the touch layer 50 and the polarizing layer 60, the two functional layers of the touch layer 50 and the polarizing layer 60 can be separated. Thus, the two functional layers are prevented from affecting each other when the two functional layers are being formed, thereby ensuring the quality of the touch layer 50 and the polarizing layer 60, and enabling the two functional layers to work normally.

As shown in FIG. 3, the protective cover plate 70 is disposed on a side of the polarizing layer 60 away from the display panel 10. In particular, the protective cover plate 70 is a single-layer or multi-layer laminated structure formed by full transparent glass or other transparent materials. The cover plate 70 can be adhered onto the polarizing layer 60 by an adhesive layer 94.

In the present embodiment, the protective cover plate 70 is a flexible cover plate. The flexible cover plate comprises a flexible substrate and a hardened thin film layer laminated on a surface of the flexible substrate. The flexible substrate may be a polymer material, such as PI, COP, or PET, and a thickness thereof is no more than 50 µm in general, so as to ensure that the flexible cover plate has desired bending performance. The hardened thin film layer is a thin film structure deposited on a surface of the flexible substrate, and a thickness thereof is no more than 10 µm in general. The strength of the flexible cover plate can be improved by the hardened thin film layer, and the characteristics, such as shatter-resistant, wear resistant, and waterproof, of the flexible cover plate can be achieved.

In addition, particularly, the protective cover plate 70 can also be used as a substrate of the polarizing layer 60, thereby thinning the screen thickness, simplifying the manufacture of the flexible display device, and improving the yield of the finished product.

As shown in FIG. 3, the back plate 80 is disposed on a side of the display panel 10 away from the glass layer 40. Particularly, the back plate 80 may be a glass material or PI, or may be other materials, which is not specifically limited in the embodiment of the present application.

In particular, the back plate 80 can be provided with heat dissipation patterns or support structures according to the actual structure of the flexible display device 100, which is not specifically limited in the embodiment of the present application.

As shown in FIG. 3, the adhesive layer 91 is used to achieve the adhesion between the display panel 10 and the adhesive back plate 80, and between the glass layer 40, the touch layer 50, the polarizing layer 60, and the protective cover plate 70. In particular, the adhesive layer may be an optical adhesive or a hydrogel. By using the optical adhesive or the hydrogel, the fixable display device 100 can be guaranteed to have a high light transmittance.

In particular, the optical adhesive may be an optically clear adhesive (OCA). The OCA is a special adhesive composition used for adhering transparent optical elements, which has advantages of colorless and transparent properties, the light transmittance of over 90%, desired adhesion strength, and has the aforementioned viscoelasticity.

As shown in FIG. 3, in the present embodiment, the flexible display device 100 has a plurality of adhesive layers, which are respectively named a first adhesive layer 91, a second adhesive layer 92, a third adhesive layer 93, and a fourth adhesive layer 94 for the convenience of distinguishing. As can be seen from FIG. 3, in the flexible display device 100 of the present embodiment, except that the adhesive layer 30 is used for adhesion between the glass layer 40 and the display panel 10, the entire surface of each of other film layers is adhered by the adhesive layer to ensure the adhesion effect between each of the film layers.

The flexible display device 100 of the present application can have the functions of blocking water vapor and protection by adhering the glass layer 40 onto the surface of the display panel 10, prevent the display panel 10 from being affected by the peeling force during the bending process, improve the bending resistance performance of the display device by setting the air spacer layer 20 between the display panel 10 and the glass layer 40, prevent edges of the display panel 10 from light leakage, and improve the display effect by using the black adhesive material or the light-absorbing adhesive.

The above is only the preferred embodiment of the present application. It should be noted that, for those of ordinary skill in the art, without departing from the principles of the present application, several improvements and refinements can be made, and these improvements and refinements shall also be regarded as the protection scope of the present application.

What is claimed is:

1. A flexible display device, comprising:
   a display panel;
   a glass layer adhered onto a surface of the display panel by an adhesive layer; and
   an air spacer layer located between the display panel and the glass layer;
   wherein the adhesive layer is disposed along an edge of the display panel to define the air spacer layer; a material of the adhesive layer is a black adhesive material or a light-absorbing adhesive, and wherein a thickness of the air spacer layer ranges from 5 to 20 µm.

2. The flexible display device according to claim 1, wherein a thickness of the glass layer is less than 100 µm.

3. The flexible display device according to claim 1, further comprising a back plate, wherein the back plate is disposed on a side of the display panel away from the glass layer.

4. The flexible display device according to claim 3, further comprising a protective cover plate, wherein the protective cover plate is disposed on a side of the glass layer away from the display panel.

5. The flexible display device according to claim 4, further comprising a touch layer, wherein the touch layer is disposed between the glass layer and the protective cover plate.

6. The flexible display device according to claim 3, further comprising a polarizing layer, wherein the polarizing layer is disposed between the touch layer and the protective cover plate.

7. A flexible display device, comprising:
   a display panel;
   a glass layer adhered onto a surface of the display panel by an adhesive layer; and
   an air spacer layer located between the display panel and the glass layer, wherein a thickness of the air spacer layer ranges from 5 to 20 µm.

8. The flexible display device according to claim 7, wherein the adhesive layer is disposed along an edge of the display panel to define the air spacer layer.

9. The flexible display device according to claim 8, wherein a material of the adhesive layer is a black adhesive material or a light-absorbing adhesive.

10. The flexible display device according to claim 7, wherein a thickness of the glass layer is less than 100 µm.

11. The flexible display device according to claim 7, further comprising a back plate, wherein the back plate is disposed on a side of the display panel away from the glass layer.

12. The flexible display device according to claim 11, further comprising a protective cover plate, wherein the protective cover plate is disposed on a side of the glass layer away from the display panel.

13. The flexible display device according to claim 12, further comprising a touch layer, wherein the touch layer is disposed between the glass layer and the protective cover plate.

14. The flexible display device according to claim 11, further comprising a polarizing layer, wherein the polarizing layer is disposed between the touch layer and the protective cover plate.

* * * * *